United States Patent
Kraft et al.

(10) Patent No.: US 6,845,484 B1
(45) Date of Patent: Jan. 18, 2005

(54) TECHNIQUE AND METHOD WHICH DYNAMICALLY GENERATES VARIOUS DEPTH LEVELS OF ABSTRACTS FOR TEXT BASED DATA SOURCES ON DEMAND

(75) Inventors: Reiner Kraft, Gilroy, CA (US); Michael L. Emens, San Jose, CA (US); Gaurav Tewari, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/559,022

(22) Filed: Apr. 27, 2000

(51) Int. Cl.⁷ ............................................... G06K 9/36
(52) U.S. Cl. .............................. 715/514; 707/3
(58) Field of Search ................... 707/3, 6, 5, 102; 715/531, 514

(56) References Cited

U.S. PATENT DOCUMENTS

| | | | | |
|---|---|---|---|---|
| 5,787,424 A | * | 7/1998 | Hill et al. ....................... 707/6 |
| 5,915,251 A | * | 6/1999 | Burrows et al. ............. 707/102 |
| 6,012,057 A | * | 1/2000 | Mayer et al. ................... 707/6 |
| 6,021,409 A | * | 2/2000 | Burrows ...................... 707/102 |
| 6,366,910 B1 | * | 4/2002 | Rajaraman et al. ............ 707/5 |
| 6,421,662 B1 | * | 7/2002 | Karten ........................... 707/3 |
| 6,539,373 B1 | * | 3/2003 | Guha ............................. 707/3 |

* cited by examiner

*Primary Examiner*—Sanjiv Shah
*Assistant Examiner*—Gautam Sain
(74) *Attorney, Agent, or Firm*—Delio & Peterson, LLC

(57) ABSTRACT

The present invention discloses a method for dynamically generating an abstract from a search result abstract retrieved from a search engine. Preferably embodied as a software program, the present invention allows a user to "zoom" in and out of the abstract thereby retrieving greater or lesser details of the abstract to further determine whether the resource is useful or not. Groups of words within the search result abstract are searched for indexable words or key words useful to the user. The indexable words are then displayed to the user. Advantageously, the process of the present invention is performed entirely on the user side without having to reset the abstract level at the server side with a new query.

6 Claims, 4 Drawing Sheets

TECHNIQUE AND METHOD WHICH DYNAMICALLY GENERATES VARIOUS DEPTH LEVELS OF ABSTRACTS FOR TEXT BASED DATA SOURCES ON DEMAND

BACKGROUND OF THE INVENTION

1. Field of the Invention

This invention is related to a technique and method for handling the amount of information retrieved from a search request sent to an Internet search engine, particularly wherein the user at the client computer side may dynamically change the depth of information from a search result abstract.

2. Description of Related Art

The advent of the Internet as an everyday useful tool in gathering information as gained considerable momentum in the past decade. People using the Internet today can be as diverse as an elementary school student searching an on-line encyclopedia to complete a homework assignment to a scientist looking for the latest articles in their field of research. There is so much information available on the Internet but there is still very little organization to the Internet that sometimes it may seem impossible to find the right information or documents that you want without having to wade through a seemingly endless list of search results.

One method of structuring information on the Internet is an index. Indexes allow the user to browse through information which has been organized according to categories such as sports, arts, business, etc., and their corresponding subcategories. One popular index on the Internet today is Yahoo!®. By selecting a category and/or a subcategory, the user finally gets to a list of documents and their uniform resource locators for further browsing.

Another popular way of finding information is to use search engines which are massive databases that cover huge portions of the Internet. Unlike an index, a search engine does not return the data in categories but as a list of hits which contain, in decreasing order, the user's key word match. Typically, an Internet search engine returns a result set for a search query consisting of a URL (uniform resource locator) and a text based abstract of the original resource. Oftentimes, the user is able to control the length of the abstract. For example, HotBot® search engine at URL http://www.hotbot.com provides the user with a choice of displaying the search results as a list of URLs, the URL with a brief abstract, or a comprehensive abstract.

However, since the abstract has been compiled at the server site, once the abstract has been retrieved, there is no way of changing the abstract detail level without issuing a new query specifying a different level of detail in the abstract. Moreover, today's search engines do not provide the capability which allows a user to "zoom" in or out of an abstract thereby allowing the user to review search results more quickly and efficiently.

Bearing in mind the problems and deficiencies of the prior art, it is therefore an object of the present invention to provide a method of reviewing search results more quickly and efficiently for the Internet user searching for information.

It is another object of the present invention to provide a method of dynamically controlling the level of information from a list of search result abstracts at the client computer.

A further object of the invention is to provide a method of "zooming" in and out of the abstract wherein the user controls the level of detail to be displayed in the search result abstract.

Still other objects and advantages of the invention will in part be obvious and will in part be apparent from the specification.

SUMMARY OF THE INVENTION

The above and other objects and advantages, which will be apparent to one of skill in the art, are achieved in the present invention which is directed to, in a first aspect, a method of summarizing a search result abstract on a client computer comprising the steps of initializing search parameters including defining a zoom level to define a search window comprising one or more words within the search result abstract; searching a first word within the search window to determine whether it is an indexable word; and adjusting the search parameters to move the search window throughout the search result abstract until a last search window is searched for an indexable word. The method of the first aspect further includes the step of displaying all found indexable words of the search result abstract. Other initial search parameters which may be initialized include, but are not limited to, a zoom function, a base index value, an offset value; a maximum search window, and a skip value.

In a second aspect, the present invention is directed to a method of locating indexable words within a search result abstract retrieved from a search engine comprising the steps of assigning a sequential number to each word of the search result abstract; determining a zoom level; defining a maximum search window based on the zoom level; setting a base index at a first word of the search result abstract wherein the base index has an initial value of one, the base index being a focal point of the maximum search window; searching for an indexable word at the base index; searching for an indexable word within the search window when the first word at the base index is not an indexable word; setting the base index at other words within the search window to establish a subsequent search window and searching for indexable words within the subsequent search window; and displaying a condensed abstract comprising found indexable words in the search result abstract. The method may further include the step of determining whether to fix the base index at a found indexable word as a basis for the step of setting the base index at other words within a subsequent search window. Preferably, the step of searching for indexable words within the search window comprises searching a number of words to the right and left of the base index within the maximum search window for an indexable word.

In a third aspect, the present invention is directed to a method of dynamically generating differing levels of detail in a search result abstract on a user computer comprising the steps of engaging a zoom function; determining a zoom level as set by a user of the user computer; determining whether a random window flag is set; assigning sequential numbers to each word of the search result abstract; initially setting a base index at a first word of the search result abstract; initially setting an offset value as a word at the base index; determining a maximum search window based on a value of the zoom level; determining a skip value based on the zoom level; determining whether a fix base index flag is set; searching a first maximum search window for an indexable word at the base index; searching subsequent maximum search windows for an indexable word at an index comprising the base index and the offset value; determining whether the offset value is greater than a value of the maximum search window wherein if the offset value is greater than the value of the maximum search window, then setting the index at a word corresponding to a value of the base index and the skip value; determining whether a word at the index is an indexable word wherein if the word at the index is not an indexable word, then adjusting the offset value such that another word is at the index; setting the base index to the indexable word at the index when the fix base index flag is set; and setting the index to the word corresponding to a value of the base index and the skip value when the fix base index flag has not been set.

Preferably, the step of adjusting the offset value comprises the steps of picking a random number within the maximum search window having a value greater than a negative value of the maximum search window and less than a value of the maximum search window when the random window flag has not been set; determining whether the offset value is equal to zero if the random window flag has not been set; obtaining another offset value by increasing the offset value by one if the offset value is determined to be equal to zero; determining whether the offset value is greater than zero if the offset value is not equal to zero; obtaining another offset value by multiplying the offset value by negative one and adding one if the offset value is greater than zero; and obtaining another offset value by multiplying the offset value by negative one if the offset value is less than zero.

In a fourth aspect, the present invention is directed to an article of manufacture comprising a computer usable medium having computer readable program code means embodied therein for causing a computer to dynamically summarize a search result abstract, the computer readable program code means in the article of manufacture comprising computer readable program code means for causing a computer to initialize search parameters including defining a search window comprising one or more words within the search result abstract; computer readable program code means for causing the computer to search the words within the search window for an indexable word; and computer readable program code means for causing the computer to adjusting the search parameters to move the search window throughout the search result abstract until a last search window is searched for an indexable word.

In a fifth aspect, the present invention is directed to an article of manufacture comprising a computer usable medium having computer readable program code means embodied therein for causing a computer to locate indexable words within a search result abstract retrieved from a search engine, the computer readable program code means in the article of manufacture comprising computer readable program code means for causing a computer to assign a sequential number to each word of the search result abstract; computer readable program code means for causing the computer to determine a zoom level; computer readable program code means for causing the computer to define a maximum search window comprising one or more words based on the zoom level; computer readable program code means for causing the computer to set a base index at a first word of the search result abstract wherein the base index has an initial value of one, the base index being a focal point of the maximum search window; computer readable program code means for causing the computer to search for an indexable word at the base index; computer readable program code means for causing the computer to search for an indexable word within the search window when the first word at the base index is not an indexable word; computer readable program code means for causing the computer to set the base index at other words to establish a subsequent search window and searching for indexable words within the subsequent search window; and computer readable program code means for causing the computer to display indexable words in accordance with the zoom level.

In a sixth aspect, the present invention is directed to an article of manufacture comprising a computer usable medium having computer readable program code means embodied therein for causing a computer to dynamically generate differing levels of detain in a search result abstract, the computer readable program code means in the article of manufacture comprising: computer readable program code means for causing a computer to engage a zoom function; computer readable program code means for causing the computer to determine a zoom level; computer readable program code means for causing a computer to determine whether a random window flag is set; computer readable program code means for causing a computer to assign sequential numbers to each word of the search result abstract; computer readable program code means for causing a computer to initially set a base index at a first word of the search result abstract; computer readable program code means for causing a computer to initially set an offset value as a word at the base index; computer readable program code means for causing a computer to determine a maximum search window based on a value of the zoom level, the maximum search window; computer readable program code means for causing a computer to determine a skip value based on the zoom level, the skip value equal to one less than twice the value of the zoom level; computer readable program code means for causing a computer to determine whether a fix base index flag is set; computer readable program code means for causing a computer to search a first maximum search window for an indexable word at the base index; computer readable program code means for causing a computer to search subsequent maximum search windows for an indexable word at an index comprising the base index and the offset value; computer readable program code means for causing a computer to determine whether the offset value is greater than a value of the maximum search window wherein if the offset value is greater than the value of the maximum search window, then setting the index [or the base index] at a word corresponding to a value of the base index and the skip value; computer readable program code means for causing a computer to determine whether a word at the index is an indexable word wherein if the word at the index is not an indexable word, then to adjust the offset value such that the index is set to another word; computer readable program code means for causing a computer to set the base index to the indexable word at the index when the fix base index flag is set; and computer readable program code means for causing a computer to set the index to the word corresponding to a value of the base index and the skip value when the fix base index flag has not been set.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
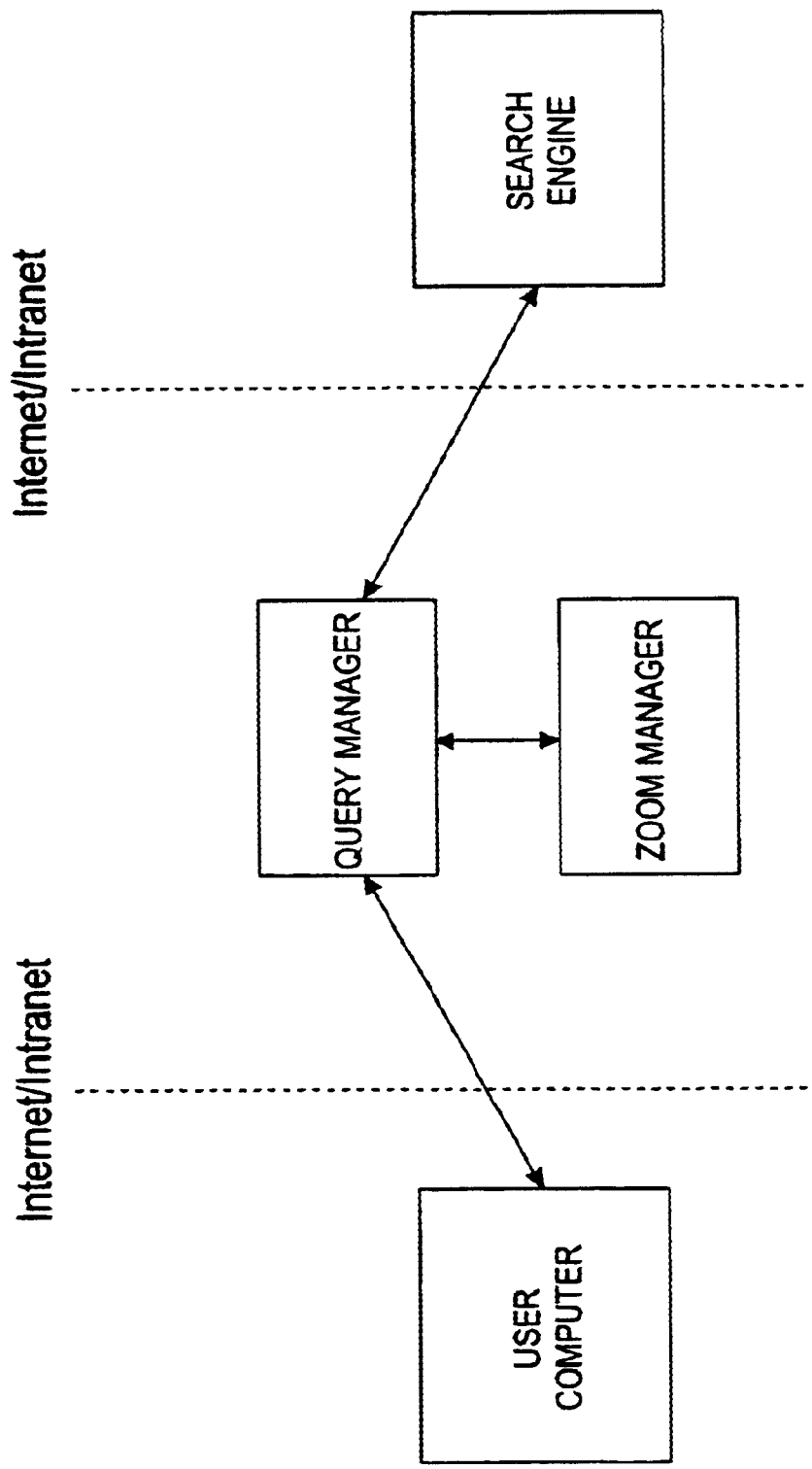
FIG. 1 is a schematic representation of the program architecture of the present invention.

In describing the preferred embodiment of the present invention, reference will be made herein to FIGS. 1-4 of the drawings in which like numerals refer to like features of the invention. Features of the invention are not necessarily shown to scale in the drawings.

Generally, the present invention provides the Internet user the ability to increase or decrease the abstract detail level for a text based resource retrieved from a list of search engine results at the user computer. Preferably, the present invention is embodied as a software program used in conjunction with a web browser incorporating known program source code or as a plug-in (a file containing data used to alter, enhance, or extend the operation of a parent application). Typical web browser programs including Netscape Navigator® available from Netscape Communications, Inc. or Internet Explorer® available from Microsoft, Inc. would support such a plug-in. The program source code embodying the present invention may be encoded in a tangible media which creates the means for causing the computer to perform the various steps of the present invention.

The software architecture of the present invention is illustrated in FIG. 1. A user sends out a search request via a web browser to a search engine. The search engine returns a list of search results containing a list of URLs and a very brief abstract. Once the user determines whether the search result is of interest, the user engages the present invention, preferably embodied as a software program, to "zoom out" of the abstract thereby retrieving greater details of the abstract to further determine whether the resource is useful or not. This process may be repeated as long as the "zoom" level satisfies the user's needs. The user is also able to "zoom in" on the abstract to diminish the detail level. The present invention provides a "zoom" manager as a means for enabling the "zooming" function and determining the "zoom" level set by the user. In addition to the "zoom" manager, the present invention also provides for a query manager which interfaces with the "zoom" manager, the client computer, and the search engine. Advantageously, the process of the present invention is performed entirely on the user side without having to reset the abstract level at the server side with a new query. The present invention could also be useful as a filter for email applications to let users quickly identify the contents of an email message allowing junk email or spam to be easily detected.

Figure 2:
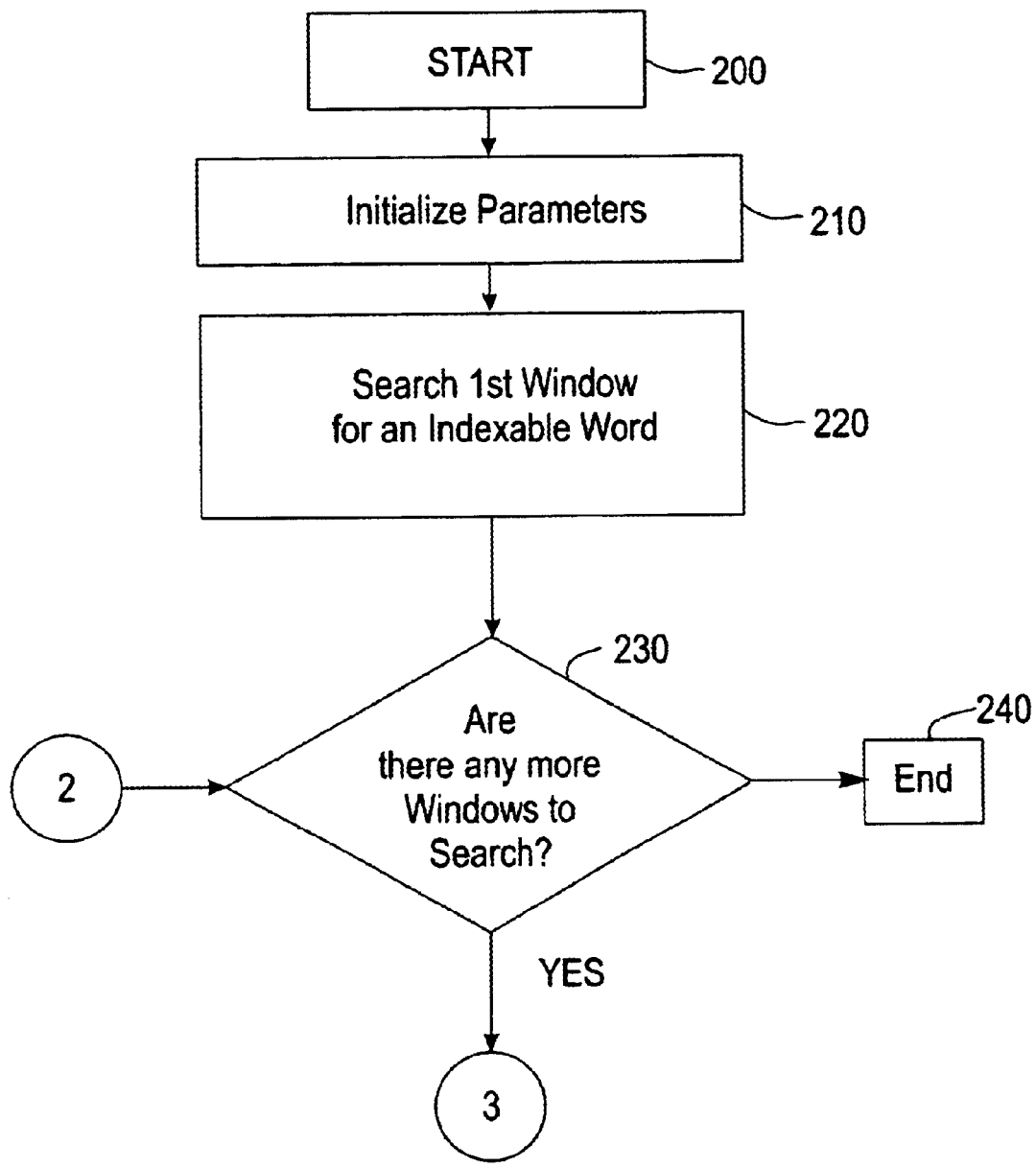
FIG. 2 is a flow diagram illustrating the overall method steps of the present invention.
Figure 3:
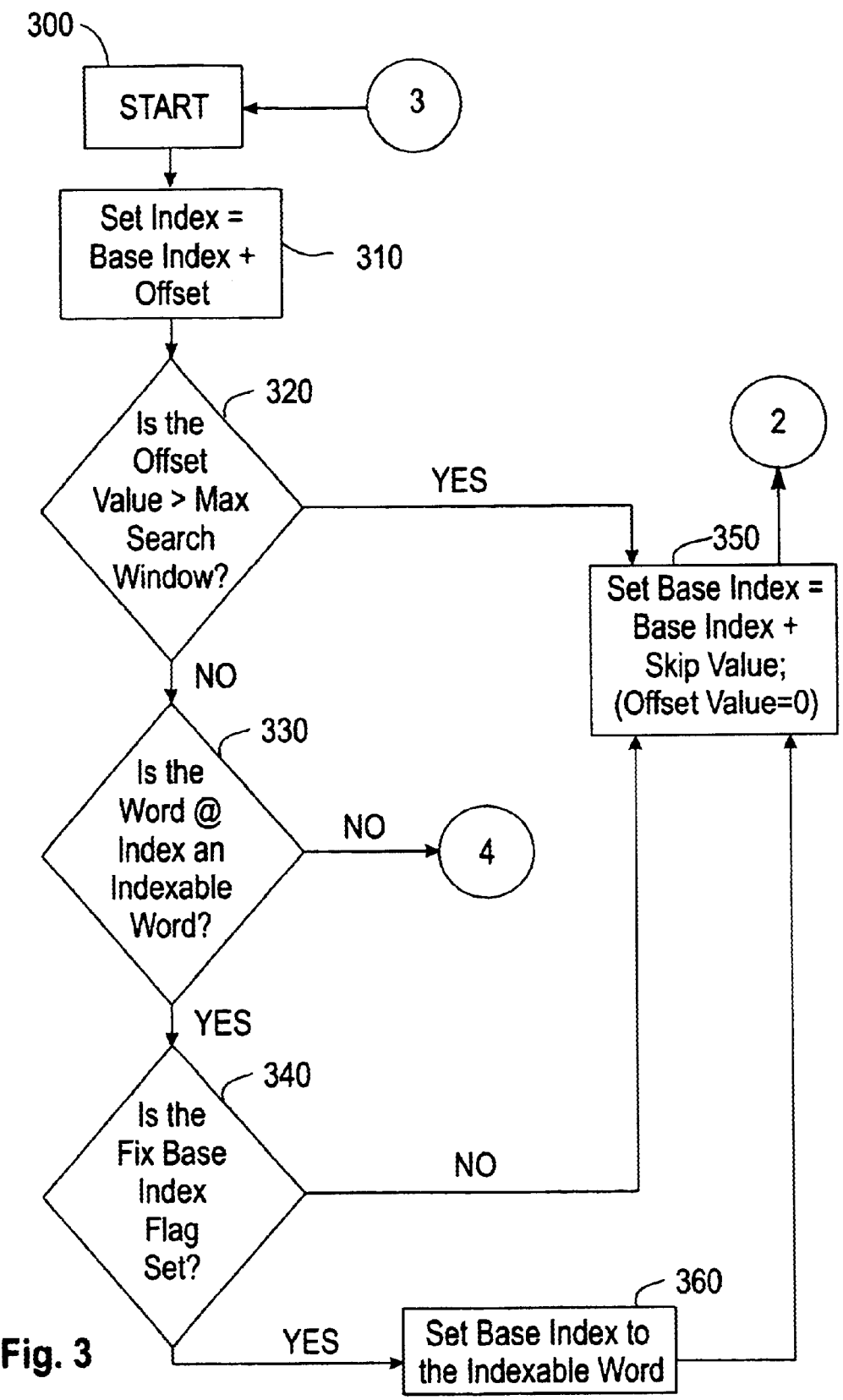
FIG. 3 is a flow diagram illustrating the method of finding a next indexable word if a search window in accordance with the present invention.

FIG. 2 is a flow diagram illustrating the overall method steps of the present invention beginning at 200 wherein each word of the abstract is determined to be an indexable word or a noise word beginning with the first word of the abstract. An indexable word is generally a noun or verb or other key word which would be of interest to the user. A noise word is typically a non-key word, e.g., pronoun, "to", "the", and the like. A dictionary of indexable words and noise words may be incorporated as a searchable table into the present invention.

A series of zooming parameters must be initialized 210 prior to searching for indexable words in the abstract. Such parameters include, but are not limited to, a "zoom" level, a maximum search window, a random window flag, a base index, an offset value, a fix base index flag, and a skip value.

The "zoom" level may have a value of zero or greater which determines the size of a maximum search window. The maximum search window has a value which is one less than the "zoom" level representing the maximum number of words within a search window which can be searched for an indexable word. When the present invention searches for an indexable word in the abstract, a windowing technique is utilized. For example, if the "zoom" level is 3, the maximum search window has a value of 2, thus, two words to the right and left of the index are searched for an indexable word. Since noise words are undesirable and will not provide much useful information to the user, another word will be searched for within the maximum window of words.

A random window flag may also be initialized at this juncture that if engaged a random windowing technique is used to locate another indexable word within the maximum search window when a found word is a noise word. A random number within the maximum search window size may be selected and the word located at the selected random number is determined to be an indexable word. Thus, the random number will have a value that is greater than a negative value of the maximum search window and less than the value of the maximum search window. A temporary storage table may be created to keep track of which words have already been searched within the maximum window to find indexable words so that a word previously searched will not be searched again.

The base index is initially set to a value of 1 relating to the first word of the abstract as a starting point from which the words in the abstract are searched to find indexable words which may be sought and displayed to the user when "zooming" has been engaged and a "zoom" level greater than 1 has been chosen. It will be shown that each word in the abstract will be sequentially numbered beginning with the base index. As each word of the abstract is searched to determine whether it is an indexable word, the base index is a constantly shifting focal point within the maximum search window until each search window of the abstract has been searched.

An offset value is the maximum number of words to the right and left of the base index within the maximum search window with the base index acting as a focal point within the maximum search window. It is initially set to zero representing a zero distance from the base index and can be increased so long as it does not extend outside the maximum search window value. The offset value is the number of words away from the base index word within the maximum search window determined to be either an-indexable word or a "noise" word. When the word at the base index is not an indexable word, the offset value can be adjusted so that an indexable word may be located within the particular search window.

The fix base index flag is used to indicate which indexable word, the absolute indexable word or the found indexable word, is used as the basis from which the next indexable word is found. If the fix base index flag has been set, the base index is set to the found indexable word as the basis upon which the next word is located. However, if the fix base index flag has not been set, the base index is moved forward by adding the skip value as a basis for locating the next indexable word.

The skip value is equal to one less than twice the value of the zoom level. It is used in determining a new base index when the fix base index flag has not been set and when the offset value is zero.

The "zooming" is engaged when selected by the user which in turn initializes the parameters discussed above. The present invention proceeds to search the first window for an indexable word 220. For example, if the zoom level has a value of 2, the maximum search window is therefore one word to the right and left of the base index. Subsequently, once the first window is searched, it is determined whether there are subsequent windows 230 which need to be searched until there are no additional windows and the process ends 240. This method of searching the maximum search window is illustrated in the flow diagram of FIG. 3 with the process of looking at the next search window beginning at 300.

At the beginning of the search abstract, the maximum search window has only the word at the base index and the words to the right of the base index within the maximum search window. There are no words to the left of the base index at the beginning of the abstract. In searching the first search window, an index is set 310 from the original base index having a value of 1, and adding the value for the offset value, initially set at zero, such that the index is located at the base index or the first word of the abstract. The offset value is compared 320 to the value of the maximum search window to determine if the offset value is greater than the value of the maximum search window. If the offset value is not greater than the value of the maximum search window, and it will not be greater when searching within that first search window since the offset value has an initial value of zero, the word at the index is searched to see if it is an indexable word 330. If the word at the index is an indexable word, the fix base index flag is considered 340. When the fix base index flag has been engaged at the time the initial parameters were initialized, the base index is then set to the indexable word 360. The word at the index is now the basis for finding the next indexable word.

Referring back to step 320, if the offset value is greater than the value of the maximum search window as in the case of searching windows occurring later on as the abstract is searched, the base index is set from the current base index and moved in accordance with a skip value 350 which was previously initialized and the next window with the new base index is searched for an indexable word. Likewise, if the fix base index flag has not been engaged, the base index is set from the current base index moving in accordance with the skip value 350, and the next window is searched.

Figure 4:
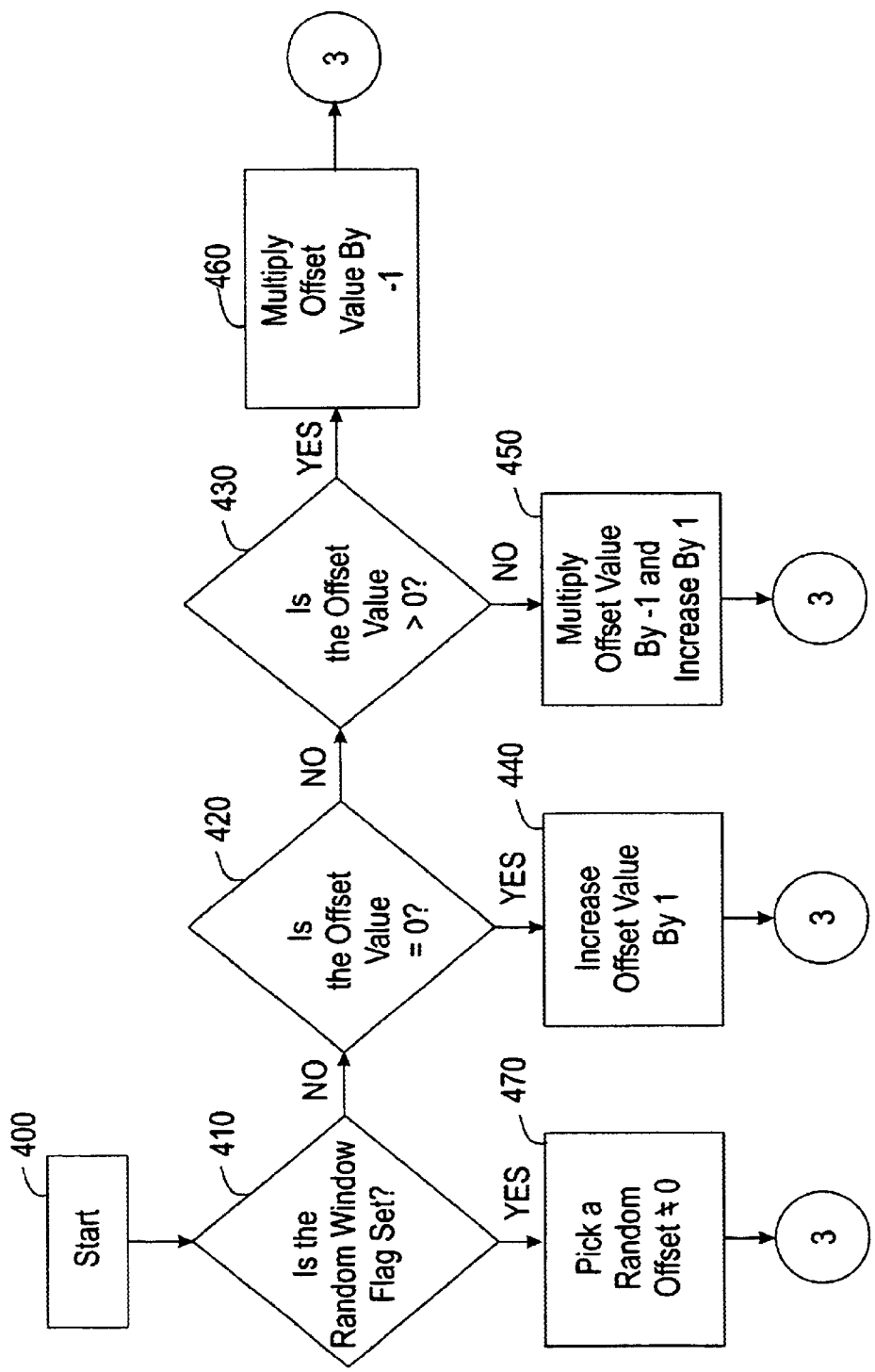
FIG. 4 is a flow diagram illustrating the method of finding a next indexable word in a search window when a word is not an indexable word in accordance with the present invention.

When the word at the index is not an indexable word, the offset value must be adjusted. FIG. 4 illustrates a flow diagram wherein the maximum window representing the maximum searchable range of words in the abstract must be adjusted in order to locate the next indexable word. The process begins at 400 where it is determined whether the random window flag has been set 410. As discussed above, if the random window flag has been engaged, a random number is selected 470 having a value between a negative value of the maximum window value and a positive value of the maximum window so long as the value has not been previously used as the base index. This random number becomes the index from which the next indexable word is located (see 310).

However, if the random window flag has not been engaged, the offset value is adjusted. First, it is determined whether the offset value has a value of zero 420. If the offset value has a value of zero as it does when it is initially set, the offset value is increased by 1 so that one word to the right of the base index may be determined to be an indexable word 440 within the maximum search window. If the offset value does not have a value of zero, it is determined 430 whether it has a value greater than zero. The offset value which does not have a value greater than zero, a negative value, is multiplied by −1 and increased by 1 so that the word to the right of the base index may be determined to be an indexable word 450. The offset value which has a value greater than zero is multiplied by −1 to obtain a negative value so that the word to the left and before the base index may be determined to be an indexable word 460. Once the offset values have been adjusted, the window is again searched to determine whether the word at the new index is an indexable word.

Once the present invention has searched every maximum search window for indexable words, a display function will display all the indexable words selected from the zooming process. Each word that has been found to be an indexable word is marked for display. Noise words will not be displayed since they provide little to no information to the user. Only when the user disengages the "zoom" function to review the entire abstract will all words in the search result abstract be displayed.

EXAMPLE #1

A search result initial abstract comprising "Yahoo! Address Book is a powerful online contact manager" is assigned sequential numbers as shown below wherein words 4 and 5 are non-indexable noise words:

| No. | Word |
| --- | --- |
| 1 | Yahoo! |
| 2 | Address |
| 3 | Book |
| 4 | is |
| 5 | a |
| 6 | powerful |
| 7 | online |
| 8 | contact |
| 9 | manager |

The method of the present invention analyses the abstract when the user engages the zoom function to initialize the zooming parameters:

| Parameters | Initial Value |
| --- | --- |
| zoom level | 2 |
| max. search window | 1 |
| random window flag | not set |
| fix base index flag | set |
| base index | 1 |
| offset | 0 |
| skip value | 3 |

The index is set at the first word of the abstract, "Yahoo!", since the index has a value of 1 comprising a value of the base index (initially set at 1) and the offset value (initially set at 0, thus, not greater than 1). The first word of the abstract, "Yahoo!" is determined to be an indexable word. When the fix base index flag is set, the base index is set to the first word, "Yahoo!", found to be an indexable word. "Yahoo!" will then be tagged for display in the condensed abstract.

The base index then jumps to word 4. However, word 4, "is", is a non-indexable noise word, thus, another indexable word must be selected. The offset value is adjusted by increasing it by 1 to determine whether word 5, "a", is an indexable word. Since word 5 is a non-indexable noise word, the offset value is again adjusted to to determine whether word 3 is indexable. Word 3, "Book", is an indexable word and is tagged for display in the condensed abstract. Note that the maximum search window will encompass words 3, 4, and 5.

The base index, at word 3, is moved in accordance with the skip value to word 6, "powerful". Word 6 being an indexable word is tagged for display in the condensed abstract. The base index then jumps to word 9, "manager", and since it is also an indexable word is tagged for display in the condensed abstract. Since the last word of the abstract is word 9, the condensed abstract is displayed as follows:

| No. | Displayed Word |
|-----|----------------|
| 1   | Yahoo!         |
| 2   | Address        |
| 3   | Book           |
| 6   | powerful       |
| 7   | online         |
| 8   | contact        |
| 9   | manager        |

The present invention achieves the objects recited above. The present method and technique allows users to "zoom" in and "zoom" out of a text based data source to generate a dynamical view of the data in a detail level controlled by the user. This allows a user to specify a convenient depth level in reviewing information particularly useful in Internet search results. The user can skim the search engine results more efficiently by changing the depth level of abstract information. The present invention makes information more manageable and provides functionality to users by identifying desired information more quickly given the overwhelming breadth of information available through the Internet.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A method of dynamically generating differing levels of detail in a search result abstract on a user computer comprising the steps of:
   engaging a zoom function;
   determining a zoom level as set by a user of the user computer;
   determining whether a random window flag is set;
   assigning sequential numbers to each word of the search result abstract;
   initially setting a base index at a first word of the search result abstract;
   initially setting an offset value as a word at the base index;
   determining a maximum search window based on a value of the zoom level;
   determining a skip value based on the zoom level;
   determining whether a fix base index flag is set;
   searching a first maximum search window for an indexable word at the base index;
   searching subsequent maximum search windows for an indexable word at an index comprising the base index and the offset value;
   determining whether the offset value is greater than a value of the maximum search window wherein if the offset value is greater than the value of the maximum search window, then setting the index at a word corresponding to a value of the base index and the skip value;
   determining whether a word at the index is an indexable word wherein if the word at the index is not an indexable word, then adjusting the offset value such that another word is at the index;
   setting the base index to the indexable word at the index when the fix base index flag is set; and
   setting the index to the word corresponding to a value of the base index and the skip value when the fix base index flag has not been set.

2. The method of claim 1 wherein the step of adjusting the offset value comprises the steps of:
   picking a random number within the maximum search window having a value greater than a negative value of the maximum search window and less than a value of the maximum search window when the random window flag has not been set;
   determining whether the offset value is equal to zero if the random window flag has not been set;
   obtaining another offset value by increasing the offset value by one if the offset value is determined to be equal to zero;
   determining whether the offset value is greater than zero if the offset value is not equal to zero;
   obtaining another offset value by multiplying the offset value by negative one and adding one if the offset value is greater than zero; and
   obtaining another offset value by multiplying the offset value by negative one if the offset value is less than zero.

3. The method of claim 2 further including the step of continuing to search the subsequent maximum search windows.

4. An article of manufacture comprising:
   a computer usable medium having computer readable program code means embodied therein for causing a computer to locate indexable words within a search result abstract retrieved from a search engine, the computer readable program code means in the article of manufacture comprising:
   computer readable program code means for causing a computer to assign a sequential number to each word of the search result abstract;
   computer readable program code means for causing the computer to determine a zoom level;
   computer readable program code means for causing the computer to define a maximum search window comprising one or more words based on the zoom level;
   computer readable program code means for causing the computer to set a base index at a first word of the search result abstract wherein the base index has an initial value of one, the base index being a focal point of the maximum search window;
   computer readable program code means for causing the computer to search for an indexable word at the base index;
   computer readable program code means for causing the computer to search for an indexable word within the search window when the first word at the base index is not an indexable word;
   computer readable program code means for causing the computer to set the base index at other words to establish a subsequent search window and searching for indexable words within the subsequent search window; and computer readable program code means for causing the computer to display indexable words in accordance with the zoom level.

5. An article of manufacture comprising:

a computer usable medium having computer readable program code means embodied therein for causing a computer to dynamically generate differing levels of detail in a search result abstract, the computer readable program code means in the article of manufacture comprising:

computer readable program code means for causing a computer to engage a zoom function;

computer readable program code means for causing the computer to determine a zoom level;

computer readable program code means for causing a computer to determine whether a random window flag is set;

computer readable program code means for causing a computer to assign sequential numbers to each word of the search result abstract;

computer readable program code means for causing a computer to initially set a base index at a first word of the search result abstract;

computer readable program code means for causing a computer to initially set an offset value as a word at the base index;

computer readable program code means for causing a computer to determine a maximum search window based on a value of the zoom level, the maximum search window;

computer readable program code means for causing a computer to determine a skip value based on the zoom level, the skip value equal to one less than twice the value of the zoom level;

computer readable program code means for causing a computer to determine whether a fix base index flag is set;

computer readable program code means for causing a computer to search a first maximum search window for an indexable word at the base index;

computer readable program code means for causing a computer to search subsequent maximum search windows for an indexable word at an index comprising the base index and the offset value;

computer readable program code means for causing a computer to determine whether the offset value is greater than a value of the maximum search window wherein if the offset value is greater than the value of the maximum search window, then setting the index at a word corresponding to a value of the base index and the skip value;

computer readable program code means for causing a computer to determine whether a word at the index is an indexable word wherein if the word at the index is not an indexable word, then to adjust the offset value such that the index is set to another word;

computer readable program code means for causing a computer to set the base index to the indexable word at the index when the fix base index flag is set; and computer readable program code means for causing a computer to set the index to the word corresponding to a value of the base index and the skip value when the fix base index flag has not been set.

6. The article of claim 5 wherein the computer readable program code means for causing a computer to adjust the offset value such that the index is set to another word comprises:

computer readable program code means for causing the computer to pick a random number within the maximum search window having a value greater than a negative value of the maximum search window and less than a value of the maximum search window when the random window flag has not been set;

computer readable program code means for causing the computer to determine whether the offset value is equal to zero if the random window flag has not been set;

computer readable program code means for causing the computer to obtain another offset value by increasing the offset value by one if the offset value is determined to be equal to zero;

computer readable program code means for causing the computer to determine whether the offset value is greater than zero if the offset value is not equal to zero;

computer readable program code means for causing the computer to obtain another offset value by multiplying the offset value by negative one and adding one if the offset value is greater than zero; and computer readable program code means for causing the computer to obtain another offset value by multiplying the offset value by negative one if the offset value is less than zero.

* * * * *